United States Patent
Peterson, Jr. et al.

(10) Patent No.: US 7,176,902 B2
(45) Date of Patent: Feb. 13, 2007

(54) WAKE-ON-TOUCH FOR VIBRATION SENSING TOUCH INPUT DEVICES

(75) Inventors: Richard A. Peterson, Jr., Chelmsford, MA (US); Thomas J. Rebeschi, Merrimack, NH (US)

(73) Assignee: 3M Innovative Properties Company, St. Paul, MN (US)

( * ) Notice: Subject to any disclaimer, the term of this patent is extended or adjusted under 35 U.S.C. 154(b) by 483 days.

(21) Appl. No.: 10/683,342

(22) Filed: Oct. 10, 2003

(65) Prior Publication Data

US 2005/0078093 A1 Apr. 14, 2005

(51) Int. Cl.
G09G 5/00 (2006.01)
G06K 11/06 (2006.01)
G06F 1/00 (2006.01)

(52) U.S. Cl. .................... 345/173; 178/18.4; 178/18.1; 178/19.01; 178/20.01; 713/300

(58) Field of Classification Search ........ 345/173–177, 345/179, 204, 157, 161, 163, 168; 178/18.01, 178/18.04–18.08, 18.1, 20.01, 19.02, 19.01; 715/300, 310, 323, 324; 713/300, 310, 323, 713/324

See application file for complete search history.

(56) References Cited

U.S. PATENT DOCUMENTS

| | | | |
|---|---|---|---|
| 4,809,177 A | | 2/1989 | Windle et al. |
| 5,854,621 A | * | 12/1998 | Junod et al. ................. 345/158 |
| 5,974,558 A | | 10/1999 | Cortopassi et al. |
| 5,996,082 A | * | 11/1999 | Cortopassi .................. 713/321 |
| 6,054,979 A | | 4/2000 | Sellers |
| 6,202,014 B1 | | 3/2001 | Brandt et al. |
| 6,278,444 B1 | | 8/2001 | Wilson et al. |
| 6,445,383 B1 | * | 9/2002 | Chambers et al. .......... 345/173 |
| 6,504,530 B1 | * | 1/2003 | Wilson et al. .............. 345/173 |
| 6,594,023 B1 | * | 7/2003 | Omura et al. ............... 356/620 |
| 6,756,700 B2 | * | 6/2004 | Zeng .......................... 307/112 |
| 6,771,250 B1 | * | 8/2004 | Oh .............................. 345/156 |
| 2001/0007087 A1 | | 7/2001 | Brandt et al. |
| 2002/0091826 A1 | | 7/2002 | Comeau et al. |
| 2002/0135570 A1 | | 9/2002 | Iisaka et al. |
| 2003/0217873 A1 | | 11/2003 | Paradiso et al. |

FOREIGN PATENT DOCUMENTS

| | | |
|---|---|---|
| WO | WO 00/64231 | 11/2000 |
| WO | WO 02/31672 | 4/2002 |
| WO | WO 2003/005292 | 1/2003 |

* cited by examiner

OTHER PUBLICATIONS

"Perfecting Your Touch" 3M Touch Systems: 3M Touch Matters E-Newsletter, [Online] [Jun. 13, 2002], [retrieved from the Internet on Nov. 10, 2005] URL: <http://web.archive.org/web/20020613162129/www.imakenews.com/eletra/mod_print_view.cfm?this_id=62011&u=3mtouch&issue_id=000012825&show=T,T,T,T,F,Article,F,F,F,F,T,T,F,F,T,T>, pp. 2.

*Primary Examiner*—Henry N. Tran
(74) *Attorney, Agent, or Firm*—Robert J. Pechman (57) ABSTRACT

Bending wave vibrations propagating in a substrate of a touch input device are sensed. Provision is made for discriminating between sensed vibrations propagating in the substrate indicative of an intended touch and sensed vibrations propagating in the substrate indicative of an unintended touch. In response to the sensed vibrations propagating in the substrate indicative of the intended touch, a wake-up signal is generated. The wake-up signal is communicated to a control system of the touch input device for transitioning the control system from a sleep state to an operational state.

51 Claims, 8 Drawing Sheets

WAKE-ON-TOUCH FOR VIBRATION SENSING TOUCH INPUT DEVICES

FIELD OF THE INVENTION

The present invention relates to touch input devices and, more particularly, to vibration sensing touch input devices that employ a wake-on-touch sensing technique.

BACKGROUND

Electronic displays employing touch input capabilities are used in a wide variety of devices, including portable or hand-held devices. A typical touch screen is constructed as an overlay to an electronic display. The touch screen may be configured as a capacitive or resistive touch screen, with transparent conductive layers as touch sensors and a pattern of electrodes made of conductive material disposed around the periphery. The touch screen may alternatively employ vibration sensors for sensing touches. Touch location can be determined in a variety of ways using touch signals produced by the touch sensors.

An increased interest in portable and hand-held electronic devices has led to a proliferation of such devices. This interest has fueled a concomitant interest in increasing portable/hand-held device longevity, particularly in terms of power requirements. Implementation of techniques that reduce power consumption in touch input devices can advantageously extend the service life of portable electronic devices that incorporate touch input capabilities between recharge or battery replacement events.

SUMMARY OF THE INVENTION

The present invention is directed to methods and systems for performing wake-on-touch sensing in a touch input device. The present invention is also directed to methods and systems for discriminating between intended and unintended touches to a touch input device, such as a vibration sensing touch input device.

In the context of various embodiments of the present invention, the term "intended touch" refers to detectable vibrations, events causing such vibrations, and signals created due to sensors receiving such vibrations, that are intended to be interpreted as a touch input. The term "unintended touch" refers to detectable vibrations, events causing such vibrations, and signals created due to sensors receiving such vibrations, that are not intended to be interpreted as a touch input. Examples of an unintended touch include external noise as well as vibration-causing impacts to the touch input device that do not produce a requisite signature in the detected signal.

According to one embodiment of a wake-on-touch methodology of the present invention, bending wave vibrations propagating in a substrate of a touch input device are sensed. The methodology further involves discriminating between sensed vibrations propagating in the substrate indicative of an intended touch and sensed vibrations propagating in the substrate indicative of an unintended touch. In response to the sensed vibrations propagating in the substrate indicative of the intended touch, a wake-up signal is generated. The wake-up signal is communicated to a control system of the touch input device for transitioning the control system from a sleep state to an operational state.

In accordance with another embodiment, a touch input device includes a substrate configured to support bending wave vibrations, and a plurality of sensors coupled to the substrate and configured to sense vibrations propagating in the substrate. Controller electronics are coupled to the sensors and configured to calculate touch location using information from sensed vibrations indicative of a touch communicated to the substrate. Wake-up circuitry is coupled to the sensors and the controller electronics. The wake-up circuitry is configured to discriminate between sensed vibrations propagating in the substrate indicative of an intended touch and sensed vibrations propagating in the substrate indicative of an unintended touch. The wake-up circuitry, in response to the sensed vibrations propagating in the substrate indicative of the intended touch, is configured to generate a wake-up signal and communicate the wake-up signal to the controller electronics.

According to another embodiment, a touch input device includes a substrate configured to support bending wave vibrations, and a plurality of sensors coupled to the substrate and configured to sense vibrations propagating in the substrate. At least one excitation transducer is coupled to the substrate. The excitation transducer imparts excitation vibrations to the substrate. Controller electronics are coupled to the sensors and configured to calculate touch location using information from sensed vibrations indicative of a touch communicated to the substrate. Wake-up circuitry is coupled to the sensors, the controller, and the excitation transducer. The wake-up circuitry is configured to detect a response of the excitation vibrations to touch vibrations imparted to the substrate and discriminate between sensed vibrations propagating in the substrate indicative of an intended touch and sensed vibrations propagating in the substrate indicative of an unintended touch. The wake-up circuitry, in response to the sensed vibrations propagating in the substrate indicative of the intended touch, is configured to generate a wake-up signal and communicate the wake-up signal to the controller electronics.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings, which form a part hereof, and in which is shown by way of illustration, various embodiments in which the invention may be practiced. It is to be understood that the embodiments may be utilized and structural changes may be made without departing from the scope of the present invention.

The present invention relates to touch activated user input devices that sense vibrations that propagate through a touch substrate for sensing by a number of touch sensors, such as piezoelectric devices for example. More particularly, the present invention relates to sensing bending wave vibrations imparted to a touch substrate and determining whether such wave vibrations resulted from intended or unintended touches to the touch substrate. Some touches to the touch substrate can also be distinguished from other touches made using different touch implements or different touch forces so that only certain intended touches are detected as wake-on touch signals. The present invention is further related to wake-on-touch circuitry and an associated method of transitioning control electronics of a vibration sensing touch input device from a sleep state to an operational state in response to discriminating intended touches from unintended touches sensed by the touch input device.

In vibration sensing touch input devices that include piezoelectric sensors, for example, vibrations propagating in the plane of the touch panel plate stress the piezoelectric sensors, causing a detectable voltage drop across the sensor. The signal received can be caused by a vibration resulting directly from the impact of a direct touch input, or by a touch input influencing an existing vibration, for example by attenuation of the vibration. The signal received can also be caused by an unintended touch input, such as a touch input resulting from user handling or mishandling of the touch input device, or from environmental sources external to, but sensed by, the touch input device.

According to one touch sensing approach, upon receiving a signal indicative of a direct touch, for example, the differential times at which the same signal is received at each of the sensors can be used to deduce the location of the touch input. As disclosed in International Publications WO 2003 005292 and WO 0148684, and in commonly owned U.S. patent application Ser. No. 10/440,650 filed May 19, 2003, entitled "Vibration Sensing Touch Input Device," each of which are hereby incorporated herein by reference, when the propagation medium is a dispersive medium, the vibration wave packet, which is composed of multiple frequencies, becomes spread out and attenuated as it propagates, making interpretation of the signal difficult. As such, it has been proposed to convert the received signals so they can be interpreted as if they were propagated in a non-dispersive medium. Such a technique is particularly suited to systems that detect bending wave vibrations.

Vibration sensing touch input devices particularly suited to detecting and determining touch position from bending wave vibrations are disclosed in the above-identified publications and application, which are wholly incorporated into this document. In such bending wave sensing touch input devices, piezoelectric sensors are typically employed, including unimorph and bimorph piezoelectric sensors.

Piezoelectric sensors offer a number of advantageous features, including, for example, good sensitivity, relative low cost, adequate robustness, potentially small form factor, adequate stability, and linearity of response. Other sensors that can be used in vibration sensing touch input devices include electrostrictive, magnetostrictive, piezoresistive, acoustic, and moving coil devices, among others.

Many applications that employ touch input devices also use electronic displays to display information through the touch input device. Since displays are typically rectangular, it is typical and convenient to use rectangular touch devices. As such, the touch substrate to which the sensors are affixed is typically rectangular in shape. According to one touch input device embodiment of the present invention, vibration sensors can be placed near the corners of the touch substrate. Because many applications call for a display to be viewed through the touch input device, it is desirable to place the sensors near the edges of the touch substrate so that they do not undesirably encroach on the viewable display area. Placement of the sensors at the corners of a touch substrate can also reduce the influence of reflections from the panel edges.

Power consumption is a design and operational concern for many devices that incorporate touch input devices, particularly portable or hand-held devices. It is generally desirable to reduce overall power consumption in such devices in order to extend device usage between battery replacement or recharging events. Many devices that incorporate touch input devices employ a main processor that consumes an appreciable amount of power when fully operational. Such devices may, in addition to a main processor, further employ an input/output (I/O) interface processor that coordinates I/O signaling and data exchange between various system and peripheral components, such as between the touch input device and an electronic system (e.g., computer system) that supports a display with which the touch input device cooperates.

It is readily appreciated that power consumed by processors and related circuitry required to support main processor activities and/or I/O signaling/data transmission during normal operations represents a significant percentage of overall system power requirements. It is also readily appreciated that significant power savings can be achieved by reducing power usage of the system during periods of non-use or idleness. Although power conservation techniques are routinely employed in a wide variety of electronic devices, such techniques are not readily adaptable for use in touch input devices that employ certain sensing technologies, such as vibration sensing or, more particularly, bending wave vibration sensing, for determining touch location.

Moreover, conventional power savings approaches are not readily adaptable to a vibration sensing methodology that is capable of discriminating between vibrations resulting from intended touches and those resulting from unintended touches. The present invention is directed to addressing power conservation in touch input devices and, in particular, power conservation in touch input devices that employ vibration sensing touch input techniques, as will be described in greater detail herein below. The present invention is also directed to circuitry and techniques for discriminating between intended and unintended touches to a vibration sensing touch input device.

Figure 1:
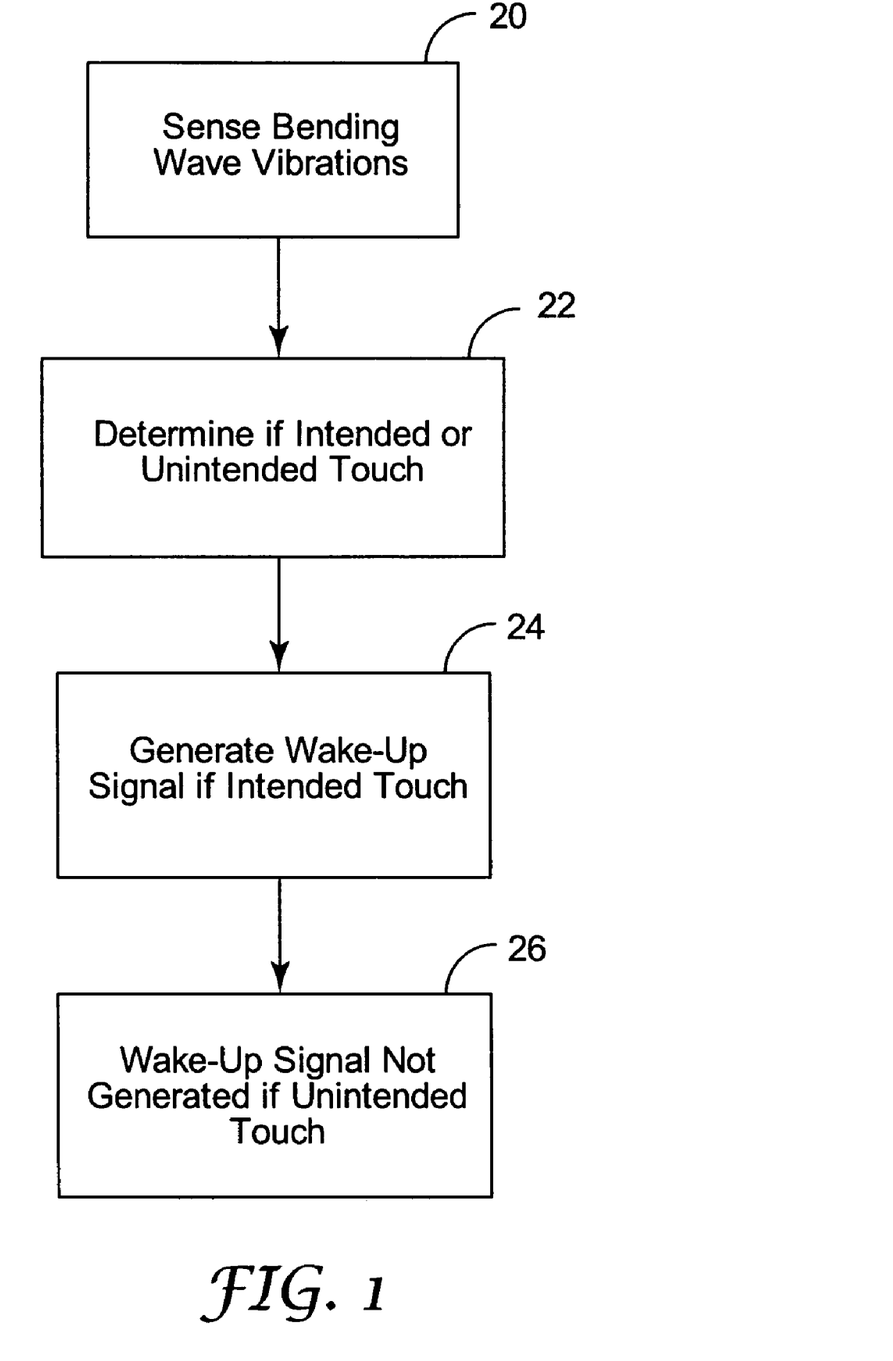
FIG. 1 is a flow chart depicting various processes associated with a wake-on-touch methodology in accordance with an embodiment of the present invention.

FIG. 1 is a flow diagram depicting various processes associated with a wake-on-touch power conservation methodology for vibration sensing touch input devices in accordance with an embodiment of the present invention. It is assumed that the subject touch input device includes one or more processors (e.g., main processor, signal processor, I/O bus processor, etc.) and wake-on-touch circuitry that, in response to detecting an intended touch, generates a wake-up signal. It is further assumed that, in response to receiving a wake-up signal, one or more of the processors transition from a sleep state (e.g., reduced or minimal power consumption mode) to an operational state (e.g., increased power consumption mode relative to that of the sleep state needed to perform some or all functions associated with full or normal operations).

In accordance with this approach, bending wave vibrations resulting from contact with, or otherwise imparted to, a touch sensitive surface of a touch input device are sensed 20. The sensed vibrations are analyzed or evaluated to determine 22 if the sensed vibrations are the result of an intended touch by the user or an unintended touch to the touch input device. In response to determining that the touch to the touch input device was intentional, a wake-up signal is generated 24. If, however, it is determined that the touch to the touch input device was unintentional, a wake-up signal is not generated 26.

Figure 2:
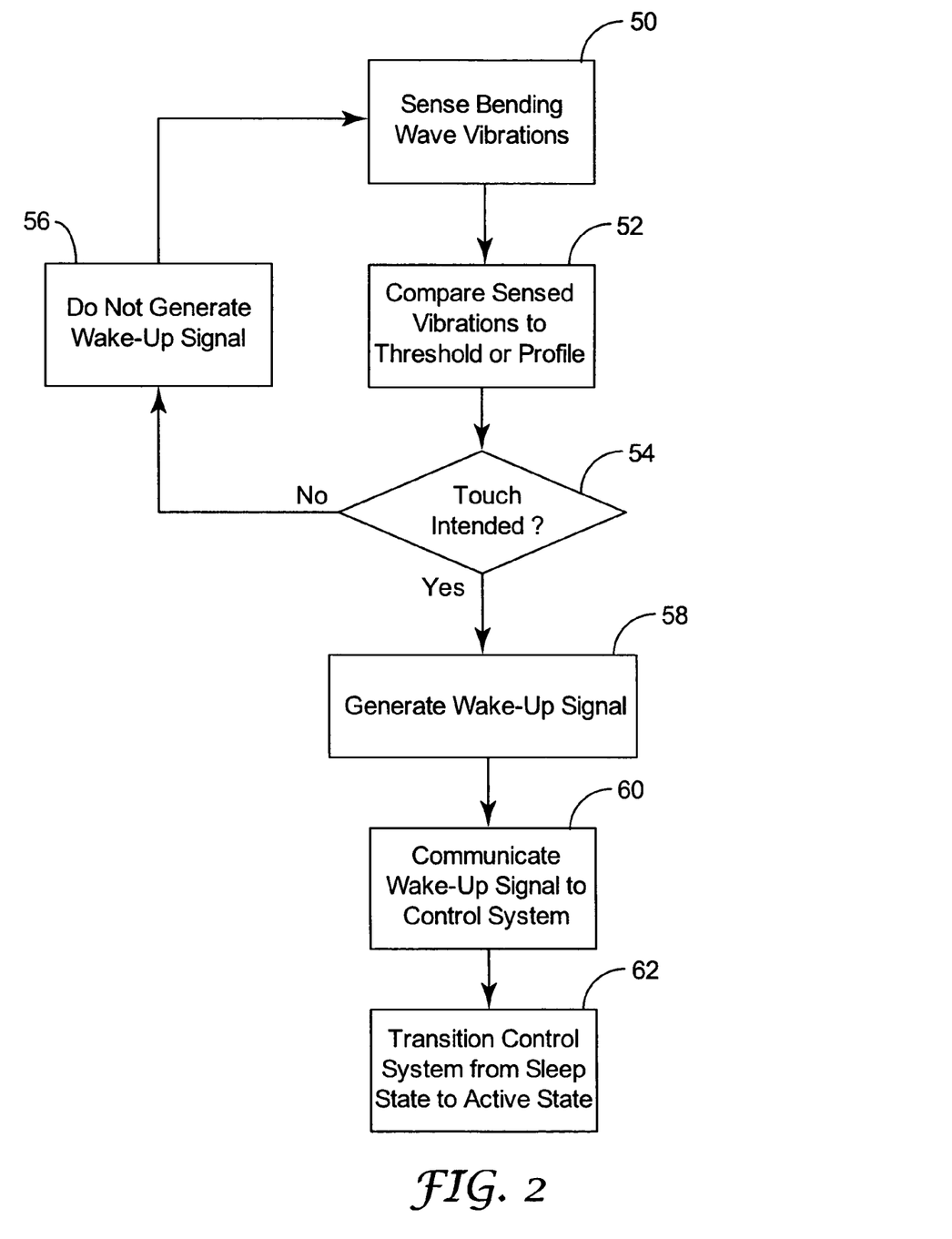
FIG. 2 is a flow chart depicting various processes associated with a wake-on-touch methodology in accordance with another embodiment of the present invention.

FIG. 2 is a flow diagram depicting various processes associated with a wake-on-touch power conservation methodology for vibration sensing touch input devices in accordance with another embodiment of the present invention. As in the embodiment described above with reference to FIG. 1, it is assumed that the subject touch input device includes one or more processors and wake-on-touch circuitry that generates a wake-up signal in response to detecting an intended touch.

As is shown in FIG. 2, bending wave vibrations resulting from contact with, or otherwise imparted to, a touch sensitive surface of a touch input device are sensed 50. The sensed vibrations are analyzed or evaluated to determine if the sensed vibrations are the result of an intended touch by the user or an unintended touch to the touch input device. The sensed bending wave vibrations are processed and compared 52 to a threshold or profile that is established to facilitate discrimination between intended touches and unintended touches. As will be described in greater detail below, discriminating between intended touches and unintended touches can be accomplished in a number of ways, including touch signal amplitude comparisons with a threshold, filtered touch signal comparisons with a threshold, time domain evaluation (e.g., signal feature correlation analysis), and frequency domain evaluation (e.g., discrete Fourier Transform (DFT) analysis), for example.

If evaluation 54 indicates that the sensed vibrations are not representative of an intended touch, a wake-up signal is not generated 56, and the one or more processors (e.g., main processor and I/O bus processor) remain in a sleep state or other type of power conservation mode. If evaluation 54 indicates that the sensed vibrations are representative of an intended touch, a wake-up signal is generated 58. The wake-up signal is communicated 60 to at least one processor or circuit of the control system or electronics of the touch input device.

In one approach, the wake-up signal is communicated to one processor, and this processor communicates one or more wake-up signals to other processors, components or devices of the touch input device. In another approach, multiple wake-up signals can be communicated to multiple processors, components or devices of the touch input device. In response to receiving a wake-up signal, the receiving component transitions 62 from a sleep state to an active state.

Figure 3:
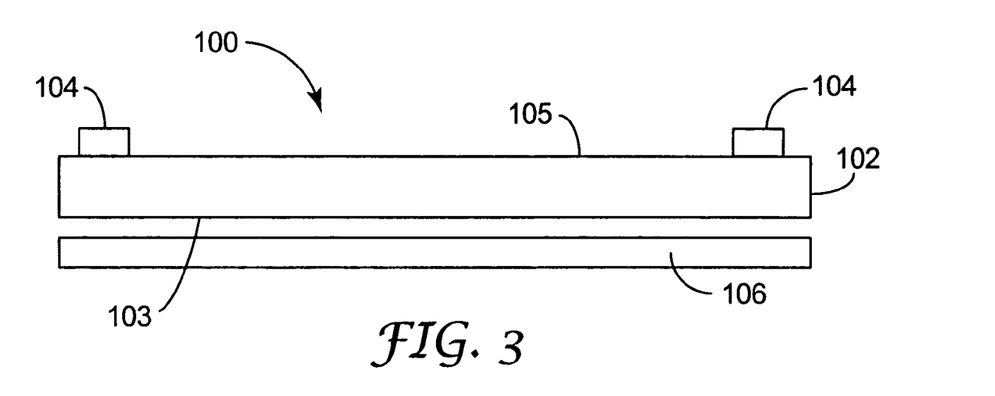
FIGS. 3 and 4 are plan and top view depictions of a touch input panel in accordance with an embodiment of the present invention.
Figure 4:
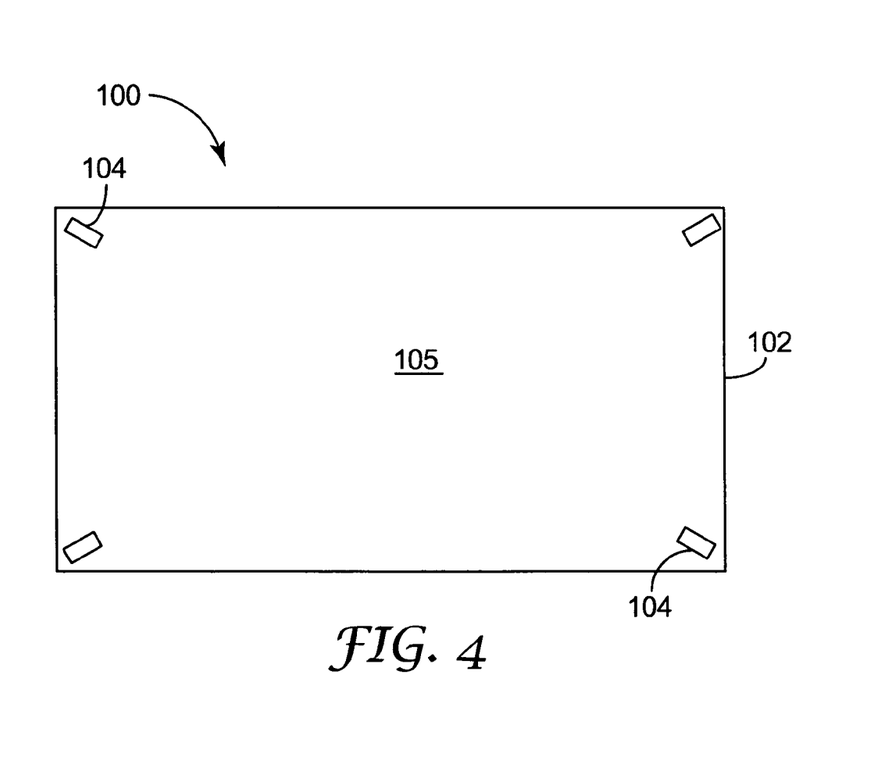

FIGS. 3 and 4 are depictions of a touch panel 100 suitable for use in a touch input device that incorporates a wake-on-touch methodology of the present invention. According to this embodiment, the touch panel 100 includes a substrate 102 and vibration sensors 104 coupled to an upper surface 105 of the substrate 102. In this illustrative example, the upper surface 105 defines a touch sensitive surface.

Although sensors 104 are shown coupled to the upper surface 105, the sensors can alternatively be coupled to the lower surface 103 of the touch panel 100. In another embodiment, one or more sensors may be coupled to the upper surface 105 while one or more other sensors may be coupled to the lower surface 103.

Substrate 102 can be any substrate that supports vibrations of interest, such as bending wave vibrations. Exemplary substrates include plastics such as acrylics or polycarbonates, glass, or other suitable materials. Substrate 102 can be transparent or opaque, and can optionally include or incorporate other layers or support additional functionalities. For example, substrate 102 can provide scratch resistance, smudge resistance, glare reduction, anti-reflection properties, light control for directionality or privacy, filtering, polarization, optical compensation, frictional texturing, coloration, graphical images, and the like.

In general, the touch panel 100 includes at least three sensors 104 to determine the position of a touch input in two dimensions, and four sensors 104 may be desirable in some embodiments, as discussed in International Publications WO 2003 005292 and WO 0148684. In the present invention, sensors 104 are piezoelectric sensors that can sense vibrations indicative of a touch input to substrate 102. Exemplary piezoelectric devices use PZT crystals.

In one embodiment, all of the sensors 104 are configured to sense vibrations in the substrate 102. In another embodiment, one or more of the sensors 104 can be used as an emitter device to emit a signal that can be sensed by the other sensors 104 to be used as a reference signal or to create vibrations that can be altered under a touch input, such altered vibrations being sensed by the sensors 104 to determine the position of the touch. An electrodynamic transducer may be used as a suitable emitter device. Moreover, one or more of the sensors 104 can be configured as a sense and excitation transducer. Sensors 104 can be affixed or bonded to substrate 102 by any suitable means, such as by use of an adhesive.

In the embodiment illustrated in FIG. 3, an optional display device 106 is shown positioned in proximity with the touch panel 100. The display device 106 is typically used to display information through the touch panel 100 toward a viewer position. The display device 106 can be any suitable electronic display, such as a liquid crystal display, an electroluminescent display, a cathode ray tube display, a plasma display, a light emitting diode display, and the like. The display device 106 may additionally or alternatively include static graphics that can be permanent or replaceable.

Figure 5A:
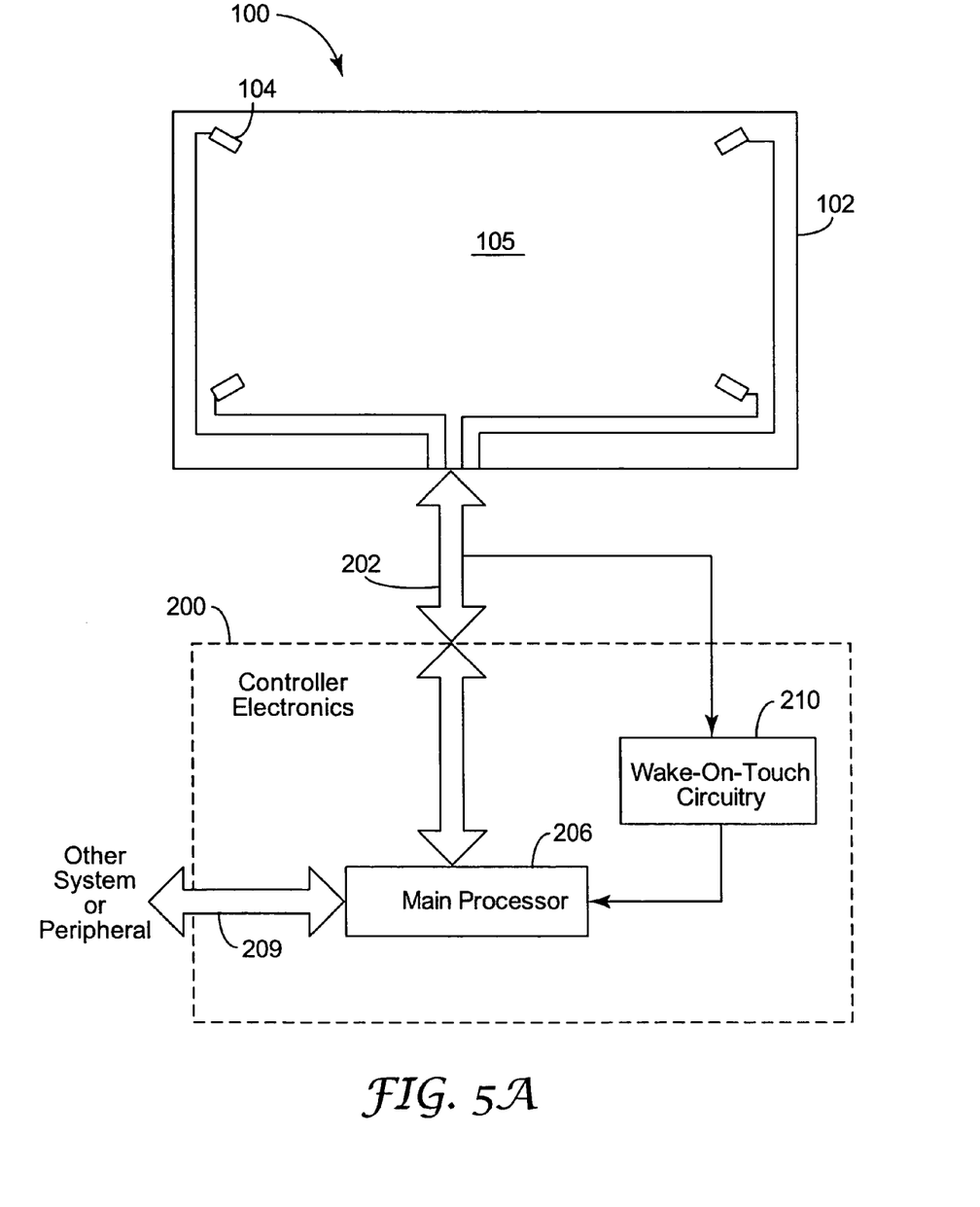
FIG. 5A is a depiction of a touch input panel coupled to controller electronics that implement a wake-on-touch methodology in accordance with an embodiment of the present invention.

FIG. 5A shows an embodiment of controller electronics 200 communicatively coupled to a touch panel 100. Controller electronics 200 is typically incorporated in a touch input device that also includes touch panel 100, although some or all elements of controller electronics 200 can be incorporated external of the touch panel housing if desired in a particular design. An interface 202 communicatively couples the touch panel 100 to controller electronics 200. Controller electronics 200 includes a main processor 206 and wake-on-touch circuitry 210. According to the configuration shown in FIG. 5A, wake-on-touch circuitry 210 is coupled to the main processor 206 and interface 202.

In this configuration, the main processor 206 is responsible for performing touch location computations, calibration, and other related functions. Main processor 206 also manages signal transmission between the touch panel 100 and controller electronics 200 via interface 202, and between the controller electronics 200 and an external system or peripheral via bus 209. Main processor 206 preferably incorporates a digital signal processor (DSP). Bus 209 communicatively couples main processor 206 with another system or device, such as a computer or display system that operates in cooperation with the touch input device of FIG. 5A.

The signals communicated from the touch panel 100 to the controller electronics 200 are typically analog current signals produced by the touch sensors 104, it being understood that the analog current signals can be converted to analog or digital voltage signals by circuitry provided between the touch panel 100 and controller electronics 200 or by circuitry of main processor 206. Excitation signals can also be communicated from controller electronics 200 to the touch panel 100 in cases where one or more emitters or emitters/sensors are provided on the substrate 102 of the touch panel 100.

Wake-on-touch circuitry 210 is shown coupled to interface 202 for purposes of sensing touch (intended or unintended) input signals generated by the sensors 104. Wake-on-touch circuitry 210 is typically configured to have high input impedance so as not to adversely affect transmission of sense signals between the touch panel 100 and controller electronics 200 via interface 202.

In another configuration, wake-on-touch circuitry 210 can be coupled between interface 202 and main processor 206. As in the above-described configuration, the wake-on-touch circuitry 210 is preferably configured to sense signals generated by the touch panel 100 for wake-on-touch evaluation, yet not adversely affect transmission of sensed signals and other signals or data between the touch panel 100 and controller electronics 200.

In response to detecting an intended touch to the touch panel 100, wake-on-touch circuitry 210 generates a wake-up signal, which is communicated to main processor 206. Main processor 206 transitions from a sleep mode to an active mode in response to receiving the wake-up signal from wake-on-touch circuitry 210. Having transitioned from sleep mode to active mode, main processor 206 resumes normal operations, including performing touch location computations.

Figure 5B:
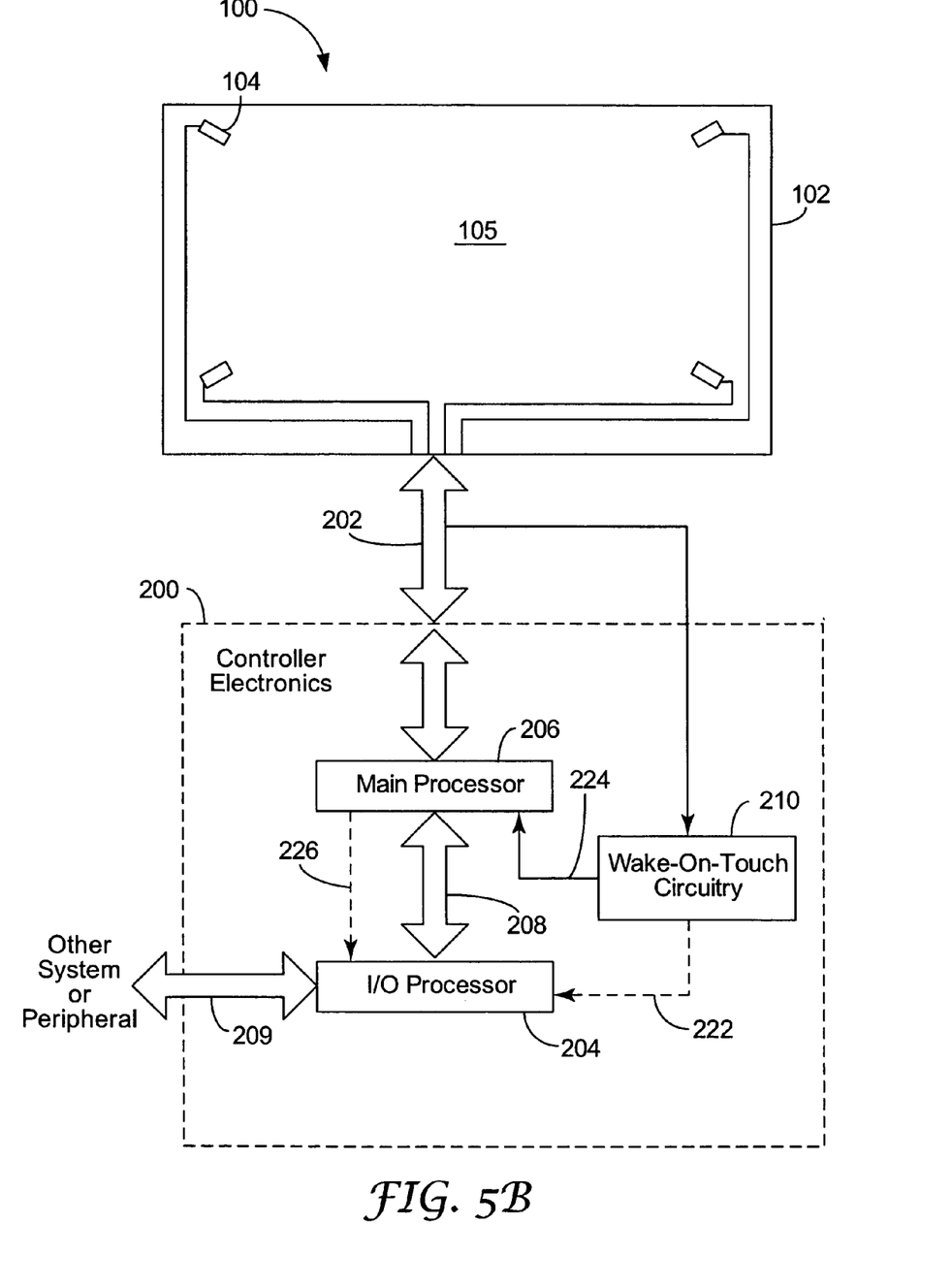
FIG. 5B is a depiction of a touch input panel coupled to controller electronics that implement a wake-on-touch methodology in accordance with another embodiment of the present invention.

FIG. 5B shows another embodiment of controller electronics 200 communicatively coupled to a touch panel 100. According to this embodiment, controller electronics 200 includes an I/O processor 204 coupled to main processor 206 via a bus 208. The I/O processor 204 is employed in this embodiment to manage I/O signaling between the controller electronics 200 and an external system or device via bus 209.

In one configuration, I/O processor 204 is implemented to manage signaling over a high-speed interface 209, such as a serial interface or bus. By way of example, bus 209 may conform to a high-speed serial bus architecture, such as a USB (Universal Serial Bus) architecture, and I/O processor 204 can be implemented to coordinate signaling over serial bus 209. In conformance with a current USB specification, I/O processor 204 can manage signaling over serial bus 209 using only one IRQ (interrupt), no matter how many devices are in use. Configuring bus 209 in accordance with a USB specification offers instant plug and play connectivity. As such, controller electronics 200 can be plugged into, and unplugged from, different ports at any time with no adverse consequence regarding connectivity. Presently, USB data rates up to 480 megabits per second (e.g., USB 2.0) can be realized.

As is shown in FIG. 5B, wake-on-touch circuitry 210 is coupled to the I/O processor 204, interface 202, and optionally to main processor 206. In another configuration, wake-on-touch circuitry 210 can be coupled to the front end of the I/O processor 204 or be incorporated as an interface between I/O processor 204 and bus 202. As in the above-described configuration, the wake-on-touch circuitry 210 is preferably configured to receive sense signals from the touch panel 100 yet not adversely affect transmission of sense signals and other signals or data between the touch panel 100 and controller electronics 200.

According to one configuration depicted in FIG. 5B, wake-on-touch circuitry 210 can be coupled to the I/O processor 204, such that a wake-up signal generated by wake-on-touch circuitry 210 is transmitted to I/O processor 204 via line 222. In this configuration, the I/O processor transitions from a sleep mode to an active mode in response to the wake-up signal. After transitioning from sleep to active mode, the I/O processor 204 may determine whether other components require activation, such as the main processor 206 or other components of the controller electronics 200 and/or control system of the portable device incorporating the touch panel 100. Alternatively, the I/O processor 204 may generate a secondary wake-up signal that is transmitted via line 226 to the main processor 206 via bus 208. In another configuration, wake-on-touch circuitry 210 can generate a wake-up signal and transmit the wake-up signal to both I/O processor 204 (via line 222) and main processor 206 (via line 224).

It is readily appreciated that a wake-on-touch methodology of the present invention can significantly reduce power consumption of touch input devices, particularly portable and hand-held touch input devices. For example, each of main processor 206 and I/O processor 204 can require several hundred milliamps of current during normal operation. With the use of wake-on-touch circuitry 210 of the present invention, most of the circuitry of main processor 206 and I/O processor 204 can be turned off in sleep mode, thereby appreciably reducing power requirements to a small fraction of that required for full operations.

Wake-on-touch circuitry 210 requires very little power to operate. For example, wake-on-touch circuitry 210 can be implemented to draw less than a few hundred microamps (e.g., <500 µA) from a 5 V DC source during sleep mode. As such, the overall current draw for controller electronics 200 in sleep mode with wake-on-touch circuitry 210 active can be less than 100 µA, for example.

Figure 6:
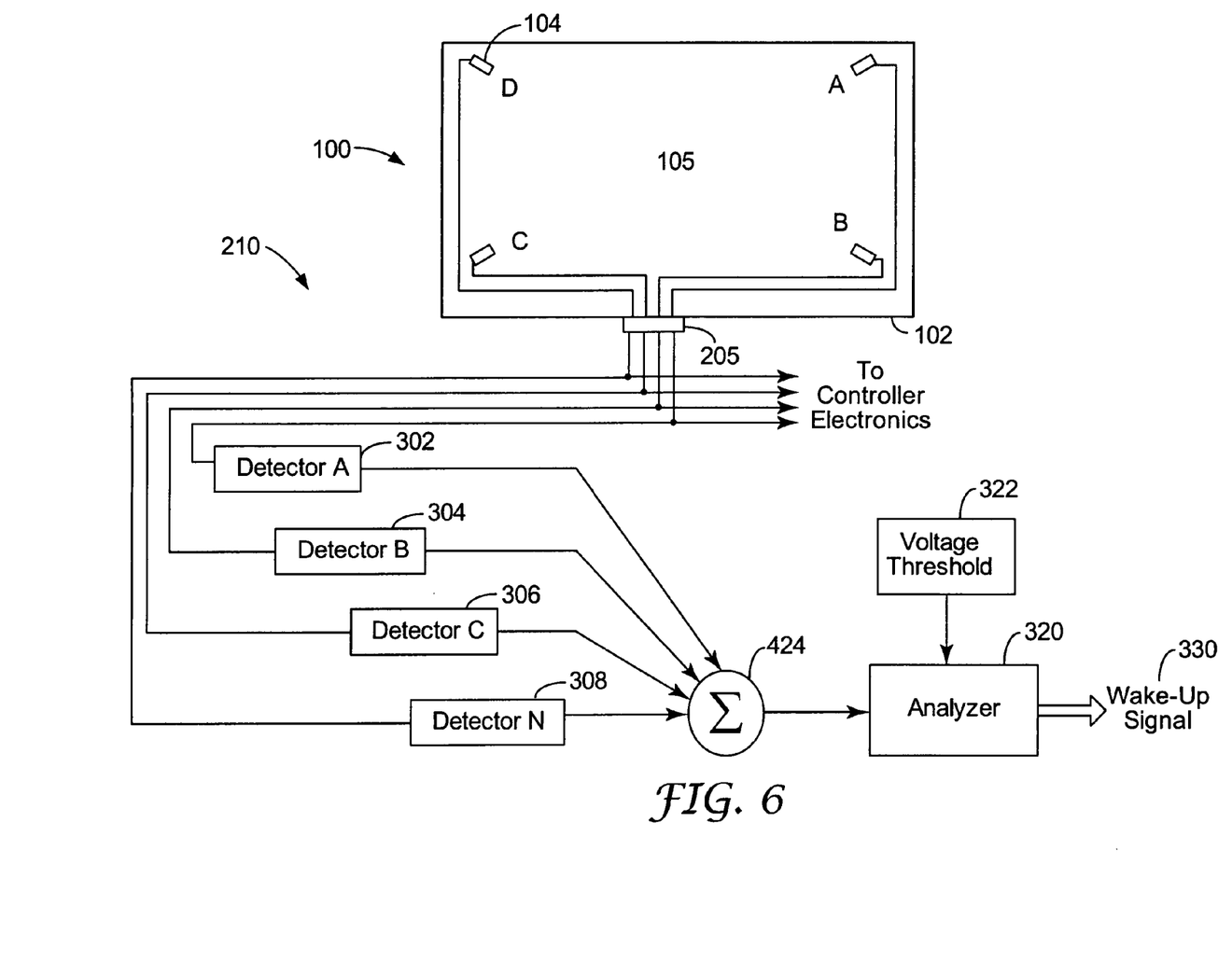
FIG. 6 is a depiction of wake-on-touch circuitry in accordance with an embodiment of the present invention.

Turning now to FIG. 6, there is shown an embodiment of wake-on-touch circuitry 210 in accordance with the present invention. According to this embodiment, wake-on-touch circuitry 210 includes several peak detectors or rectifiers 302, 304, 306, 308 each coupled to a respective sensor 104. The peak detectors 302, 304, 306, 308 preferably have sufficiently high input impedance so as not to adversely affect sense signal transmission between the touch panel 100 and controller electronics 200. The peak detectors 302, 304, 306, 308 or other upstream circuits convert the current sense signals developed by the sensors 104 to corresponding voltage sense signals.

The peak voltage signals output from peak detectors 302, 304, 306, 308 are input to a summing device 424. A summed voltage signal is communicated from the summing device 424 to a voltage analyzer 320, such as a comparator. The voltage analyzer 320 compares a preestablished voltage threshold 322 with the summed voltage signal to discriminate between intended touches and unintended touches imparted to the input device 100. More particularly, the voltage analyzer 320 compares the preestablished voltage threshold 322 with the summed voltage signal and, if the summed voltage signal exceeds the preestablished voltage threshold 322, the summed voltage signal is indicative of an intended touch. In response to such determination, the analyzer 320 generates a wake-up signal 330.

According to another configuration detectors 302, 304, 306, 308 can be implemented to include filters having a frequency response that facilitates intended/unintended touch discrimination. For example, an intended touch applicable to a particular touch input device may be characterized to have a certain frequency content which is distinguishable from that of an unintended touch. An intended tap to the touch substrate, for example, may be characterized as a relatively short duration event associated with relatively high frequency content. An unintended touch to the touch substrate, such as one resulting from resting of the palm on the touch substrate, may be characterized as a relatively long duration event associated with relatively low frequency content relative to an intended touch event. Other tap/touch characterizations can be made, and frequency content can be associated with intended and unintended touches accordingly. In one configuration, for example, each of the detectors 302, 304, 306, 308 can be implemented to include high pass or band pass filters that are tuned to discriminate intended touches from unintended touches for a particular touch input device.

Figure 7:
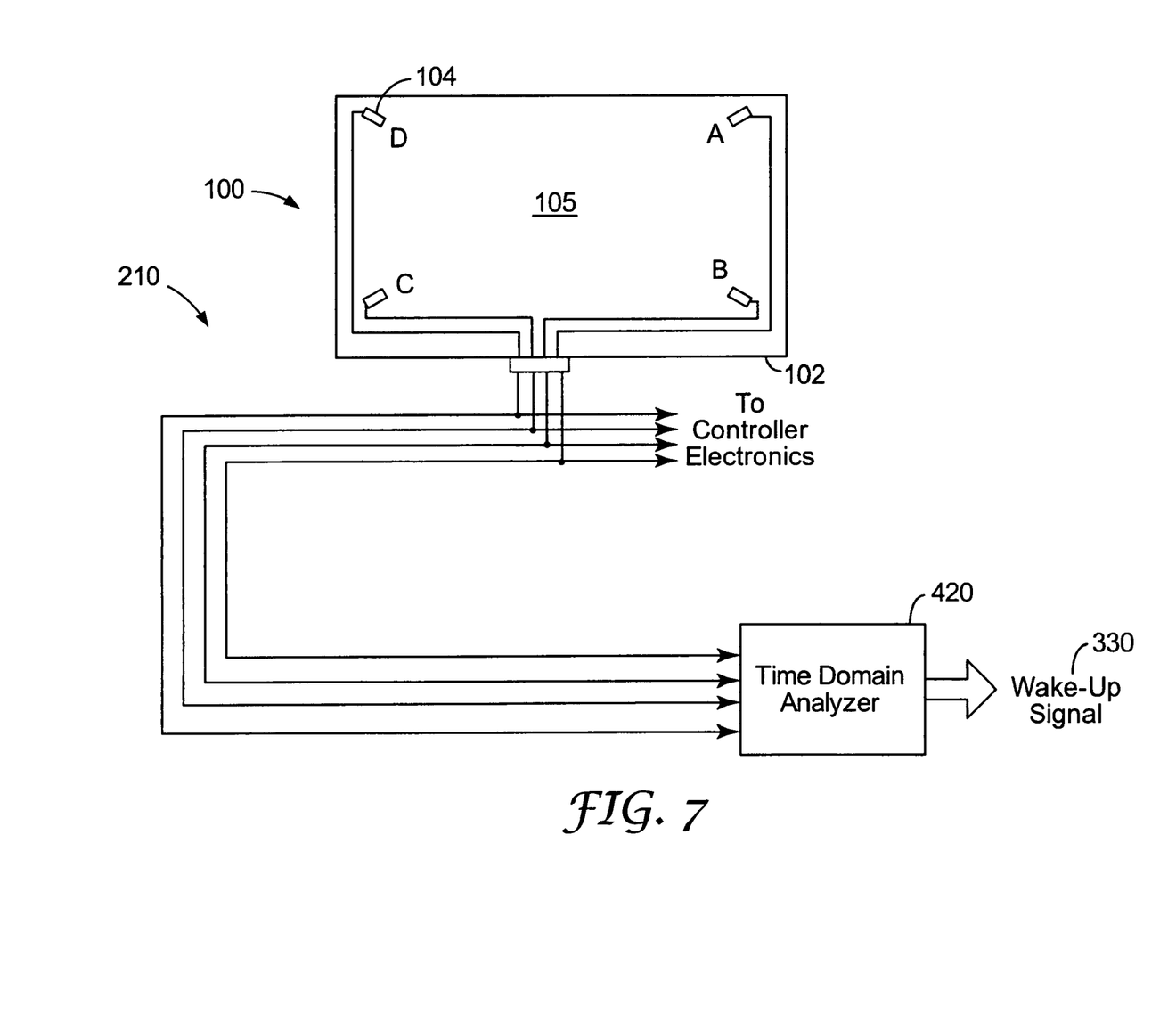
FIG. 7 is a depiction of wake-on-touch circuitry in accordance with another embodiment of the present invention.

FIG. 7 shows another embodiment of wake-on-touch circuitry 210 in accordance with the present invention. According to this embodiment, wake-on-touch circuitry 210 includes a time domain analyzer 420 that performs intended/unintended touch discrimination. The time domain analyzer 420 may be implemented to evaluate transduced sense signals according to several different evaluation techniques.

For example, one or more features of a sense signal can be evaluated and compared to a threshold or profile to discriminate between intended and unintended touches. A non-exhaustive list of such features includes amplitude, time duration, shape, area, width, rise time, decay time, and slope (e.g., rate of change of rise time or decay time). Thresholds or profiles can be established for such features and used by the time domain analyzer 420 to perform touch discrimination. The analysis may involve evaluation of multiple sense signal features, and may employ a tiered or weighted evaluation technique.

By way of further example, one or more touch signal profiles can be developed that are representative of an actual/intended touch to a particular touch input device. One or more preestablished touch signal profiles can be compared with a candidate touch signal to determine whether the candidate touch signal is sufficiently similar or dissimilar to the touch signal profile(s). If sufficiently similar, the time domain analyzer 420 can consider the candidate touch signal to be representative of an intended touch. If sufficiently dissimilar, the candidate touch signal can be considered representative of an unintended touch.

According to another approach, touch signal profiles can be developed that characterize intended or unintended touch signal data in terms of one or more of the above-listed features of a touch signal as a function of time. For example, amplitude values of a candidate touch signal can be plotted as a function of time, and features of this plot can be selected. A similar set of features can be selected for one or more touch signal profiles. A correlation can be performed on the features of the candidate touch signal and that of the touch signal profile to generate a correlation coefficient. The calculated correlation coefficient can be compared to a threshold (e.g., 80%) to discriminate between intended and unintended touches.

Figure 8:
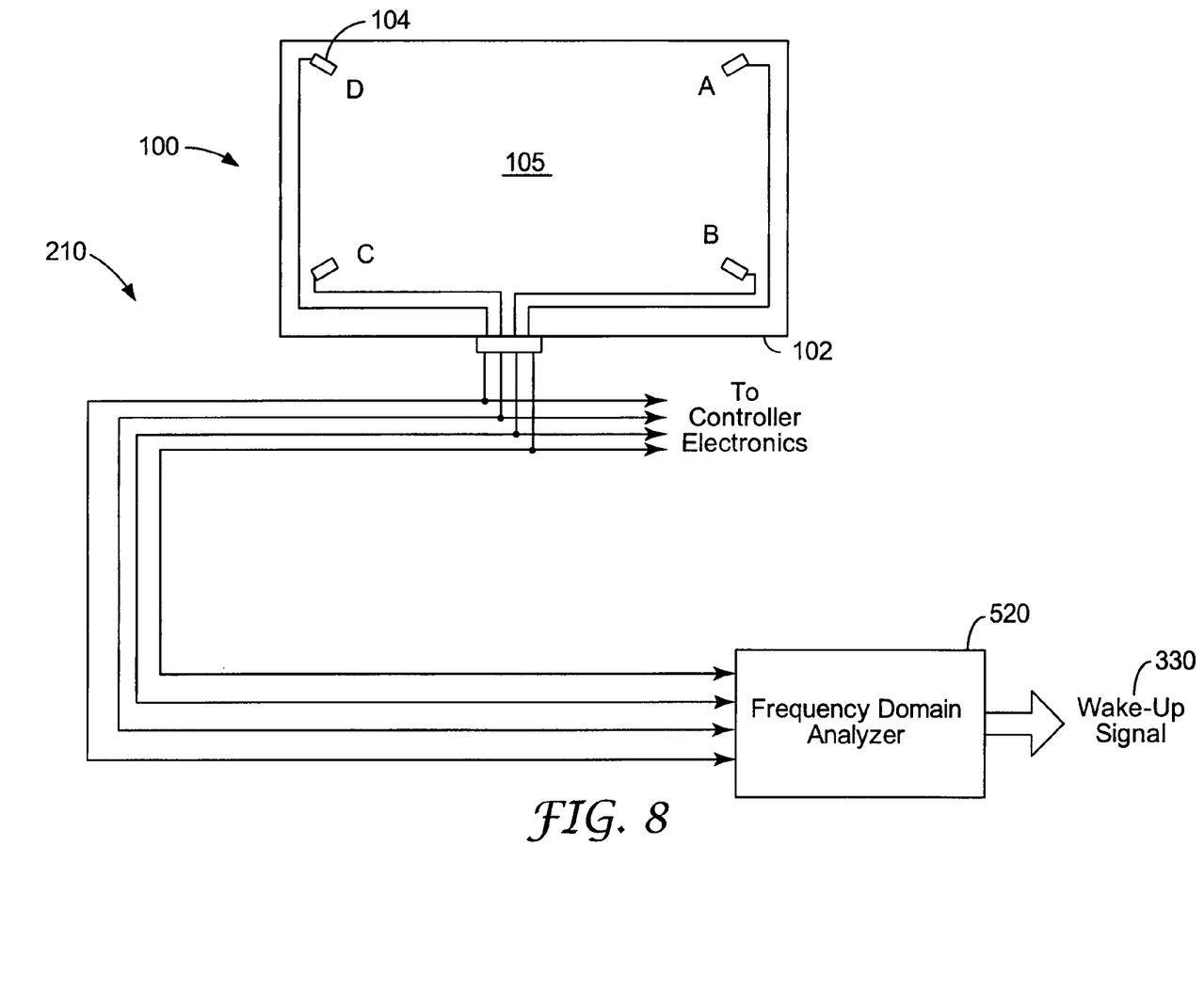
FIG. 8 is a depiction of wake-on-touch circuitry in accordance with a further embodiment of the present invention.

FIG. 8 shows another embodiment of wake-on-touch circuitry 210 in accordance with the present invention. According to this embodiment, wake-on-touch circuitry 210 includes a frequency domain analyzer 520 that performs intended/unintended touch discrimination. The frequency domain analyzer 520 may be implemented to evaluate frequency content in the transduced sense signals according to several different evaluation techniques.

The frequency domain analyzer 520 may transform voltage versus time representations into magnitude versus frequency and phase versus frequency representations, with magnitude versus frequency representations being of particular interest. The frequency domain analyzer 520 may, for example, perform a discrete Fourier transform (DFT), such as a fast Fourier transform (FFT), on the sense voltage signals. The transformed candidate touch signal data can be compared to preestablished touch signal profile data (e.g., frequency vs. amplitude, power or energy content) by the frequency domain analyzer 520 to determine whether the candidate touch signal represents an intended or unintended touch.

For example, intended and/or unintended touch profiles can be developed that characterize these touch types in terms of characteristic amplitude components at certain frequencies. The frequency domain analyzer 520 can, for example, perform a discrete cosine transform on a candidate touch signal to obtain a reduced set of detection features. The frequency domain analyzer 520 may then perform a pattern recognition procedure using appropriate intended and/or unintended touch profiles and the candidate touch signal transform. A sufficient match between the candidate touch signal transform features and those of one or more intended and/or unintended touch profiles can indicate detection of an intended touch or an unintended touch.

It will be appreciated that the frequency spectra, in particular the amplitude spectra, of touch signals can be used by the frequency domain analyzer 520 to perform intended/unintended touch discrimination. For example, the amplitude spectral density or energy spectral density of a candidate touch signal can be analyzed relative to that of a given touch signal profile. The area under the curve between frequencies of a candidate touch signal and a touch signal profile can be compared for determining the degree of similarity or dissimilarity there between. Matching criteria can be established and used by the frequency domain analyzer 520 to discern between intended and unintended touches imparted to the touch input device.

It is understood that many touch discrimination techniques described herein are readily adaptable for use in wake-on-touch applications in which power conservation is desired. It is also understood that some touch discrimination techniques described herein may require more computational power than others, and may not provide sizable gains in terms of power conservation. It is believed, however, that such touch discrimination techniques find separate utility as enhanced approaches to intended/unintended touch discrimination in vibration sensing touch input devices.

The foregoing description of the various embodiments of the invention has been presented for the purposes of illustration and description. It is not intended to be exhaustive or to limit the invention to the precise form disclosed. Many modifications and variations are possible in light of the above teaching. For example, the touch discrimination techniques disclosed herein can have utility separate from those associated with power conservation. As such, embodiments are contemplated that employ intended/unintended touch discrimination techniques alone or in combination with power conservation techniques. It is intended that the scope of the invention be limited not by this detailed description, but rather by the claims appended hereto.

What we claim is:

1. A touch input device, comprising:
    a substrate configured to support bending wave vibrations;
    a plurality of sensors coupled to the substrate and configured to sense vibrations propagating in the substrate;
    controller electronics coupled to the sensors and configured to calculate touch location using information from sensed vibrations indicative of a touch communicated to the substrate; and wake-up circuitry coupled to the sensors and the controller electronics, the wake-up circuitry configured to discriminate between sensed vibrations propagating in the substrate indicative of an intended touch and sensed vibrations propagating in the substrate indicative of an unintended touch, the wake-up circuitry, in response to the sensed vibrations propagating in the substrate indicative of the intended touch, configured to generate a wake-up signal and communicate the wake-up signal to the controller electronics.

2. The device according to claim 1, wherein the wake-up circuitry is configured to discriminate between the intended and unintended touch vibrations by comparing the touch vibrations to a threshold value.

3. The device according to claim 1, wherein the wake-up circuitry is configured to discriminate between the intended and unintended touch vibrations by comparing an amplitude associated with the touch vibrations to a threshold value.

4. The device according to claim 3, wherein the threshold represents a fraction of an amplitude associated with the intended touch vibrations.

5. The device according to claim 1, wherein the wake-up circuitry is configured to discriminate between the intended and unintended touch vibrations by comparing a peak amplitude associated with the touch vibrations to a threshold value.

6. The device according to claim 1, wherein the wake-up circuitry is configured to discriminate between the intended and unintended touch vibrations by comparing a summation of peak amplitudes respectively acquired from the sensors to a threshold value.

7. The device according to claim 1, wherein the wake-up circuitry is configured to discriminate between the intended and unintended touch vibrations by comparing a frequency response associated with the touch vibrations to a frequency signature.

8. The device according to claim 7, wherein the frequency signature comprises a band or bands of frequencies associated with touch vibrations indicative of the intended touch.

9. The device according to claim 1, wherein the sensors comprise acoustic sensors.

10. The device according to claim 1, wherein the sensors comprise piezoelectric sensors.

11. The device according to claim 1, wherein the controller electronics comprise a bus controller and a primary processor, the wake-up circuitry coupled to the bus controller.

12. The device according to claim 11, wherein the bus controller comprises a plug-and-play bus controller and the primary processor comprises a digital signal processor (DSP).

13. The device according to claim 11, wherein the bus controller comprises a universal serial bus (USB) controller and the primary processor comprises a digital signal processor (DSP).

14. The device according to claim 1, wherein the controller electronics comprise a bus controller and a primary processor, the wake-up circuitry, in response to the vibrations propagating in the substrate indicative of the intended touch, communicating the wake-up signal to the bus controller which responsively transitions from a sleep state to an operational state.

15. The device according to claim 14, wherein the bus controller, after transitioning from the sleep state to the operational state, communicates a wake-up signal to the primary processor, which responsively transitions from a sleep state to an operational state.

16. The device according to claim 1, wherein the touch input device defines a passive touch input device.

17. The device according to claim 1, further comprising:
a display coupled to the touch input device; and
a host processor coupled to the display and the touch input device.

18. A touch input device, comprising:
a substrate configured to support bending wave vibrations;
a plurality of sensors coupled to the substrate and configured to sense vibrations propagating in the substrate;
controller electronics coupled to the sensors and configured to calculate touch location using information from sensed vibrations indicative of a touch communicated to the substrate;
at least one excitation transducer coupled to the substrate, the excitation transducer imparting excitation vibrations to the substrate; and
wake-up circuitry coupled to the sensors, the controller, and the excitation transducer, the wake-up circuitry configured to detect a response of the excitation vibrations to touch vibrations imparted to the substrate and discriminate between sensed vibrations propagating in the substrate indicative of an intended touch and sensed vibrations propagating in the substrate indicative of an unintended touch, the wake-up circuitry, in response to the sensed vibrations propagating in the substrate indicative of the intended touch, configured to generate a wake-up signal and communicate the wake-up signal to the controller electronics.

19. The device according to claim 18, wherein the excitation transducer comprises a bending transducer.

20. The device according to claim 18, wherein the excitation transducer comprises an inertial transducer.

21. The device according to claim 18, wherein at least one of the plurality of sensors defines a sense and excitation transducer.

22. The device according to claim 18, wherein the plurality of sensors comprises the at least one excitation transducer.

23. The device according to claim 18, wherein the excitation transducer comprises a piezoelectric transducer.

24. The device according to claim 18, wherein the excitation transducer comprises an electrodynamic transducer.

25. The device according to claim 18, wherein the sensors comprise acoustic sensors.

26. The device according to claim 18, wherein the sensors comprise piezoelectric sensors.

27. The device according to claim 18, wherein the controller electronics comprise a bus controller and a primary processor, the wake-up circuitry coupled to the bus controller.

28. The device according to claim 27, wherein the bus controller comprises a universal serial bus (USB) controller and the primary processor comprises a digital signal processor (DSP).

29. The device according to claim 18, wherein the controller electronics comprise a bus controller and a primary processor, the wake-up circuitry, in response to the vibrations propagating in the substrate indicative of the intended touch, communicating the wake-up signal to the bus controller, which responsively transitions from a sleep state to an operational state.

30. The device according to claim 29, wherein the bus controller, after transitioning from the sleep state to the operational state, communicates a wake-up signal to the primary processor, which responsively transitions from a sleep state to an operational state.

31. The device according to claim 18, wherein the wake-up circuitry compares the detected response to a threshold value to discriminate between the intended and unintended touch vibrations imparted to the substrate.

32. The device according to claim 31, wherein the threshold value is representative of a frequency response associated with one or both of the intended and unintended touch vibrations.

33. The device according to claim 31, wherein the threshold value is representative of a band or bands of frequencies associated with one or both of the intended and unintended touch vibrations.

34. The device according to claim 31, wherein the threshold value represents an amplitude profile associated with one or both of the intended and unintended touch vibrations.

35. The device according to claim 18, further comprising:
a display coupled to the touch input device; and
a host processor coupled to the display and the touch input device.

36. A method, comprising:
sensing bending wave vibrations propagating in a substrate of a touch input device;
discriminating between sensed vibrations propagating in the substrate indicative of an intended touch and sensed vibrations propagating in the substrate indicative of an unintended touch;
in response to the sensed vibrations propagating in the substrate indicative of the intended touch, generating a wake-up signal; and
communicating the wake-up signal to a control system for transitioning the control system from a sleep state to an operational state.

37. The method according to claim 36, wherein the control system comprises a bus controller, and the wake-up signal is communicated to the bus controller for transitioning the bus controller from a sleep state to an operational state.

38. The method according to claim 36, wherein:
the control system comprises a bus controller and a primary processor;
a first wake-up signal is communicated to the bus controller for transitioning the bus controller from a sleep state to an operational state; and
a second wake-up signal is communicated from the bus controller to the primary processor for transitioning the primary processor from a sleep state to an operational state.

39. The method according to claim 36, wherein sensing the bending wave vibrations is performed passively.

40. The method according to claim 36, wherein sensing the bending wave vibrations is performed actively.

41. The method according to claim 36, further comprising imparting excitation vibrations to the substrate, wherein sensing the bending wave vibrations comprises detecting a response of the excitation vibrations to touch vibrations imparted to the substrate.

42. The method according to claim 36, wherein discriminating between intended and unintended touch vibrations comprises comparing the sensed bending wave vibrations to a threshold value.

43. The method according to claim 42, wherein the threshold value is representative of a frequency response associated with one or both of the intended and unintended touch vibrations.

44. The method according to claim 42, wherein the threshold value is representative of a band or bands of frequencies associated with one or both of the intended and unintended touch vibrations.

45. The method according to claim 42, wherein the threshold value represents an amplitude profile associated with one or both of the intended and unintended touch vibrations.

46. The method according to claim 42, wherein the threshold value represents a fraction of an amplitude associated with the intended touch vibrations.

47. The method according to claim 36, wherein discriminating between intended and unintended touch vibrations comprises comparing a peak amplitude associated with the touch vibrations to a threshold value.

48. The method according to claim 36, wherein discriminating between intended and unintended touch vibrations comprises comparing a summation of peak sense amplitudes to a threshold value.

49. The method according to claim 36, wherein sensing the bending wave vibrations comprises acoustically sensing the bending wave vibrations.

50. The method according to claim 36, wherein sensing the bending wave vibrations comprises piezoelectrically sensing the bending wave vibrations.

51. A touch input device, comprising:
means for sensing bending wave vibrations propagating in a substrate of a touch input device;
means for discriminating between sensed vibrations propagating in the substrate indicative of an intended touch and sensed vibrations propagating in the substrate indicative of an unintended touch;
means for generating a wake-up signal in response to the sensed vibrations propagating in the substrate indicative of the intended touch; and
means for communicating the wake-up signal to a control system, whereby the control system transitions from a sleep state to an operational state in response to the wake-up signal.

* * * * *